UNITED STATES PATENT OFFICE.

LUDWIG PREUSSNER, OF PHILADELPHIA, PENNSYLVANIA.

PROCESS OF PRODUCING ARTIFICIAL STONE.

SPECIFICATION forming part of Letters Patent No. 424,353, dated March 25, 1890.

Application filed November 11, 1889. Serial No. 329,936. (No specimens.)

*To all whom it may concern:*

Be it known that I, LUDWIG PREUSSNER, of Philadelphia, in the county of Philadelphia and State of Pennsylvania, a citizen of the German Empire, have invented certain new and useful Improvements in the Process of Producing Artificial Stone, of which the following is a specification.

This invention has reference to an improved process of making imitation stone of great hardness and permanency; and the invention consists in mixing burnt magnesia with a concentrated mixture of muriatic acid and boric acid in such proportions that basic magnesium chloride and magnesium borate are obtained. The liquid mass is mixed after the reaction has taken place with a pigment and a suitable filling substance and run into hard-rubber molds.

In carrying out my process the burnt magnesia of commerce is mixed with a concentrated mixture of muriatic acid and boric acid in the following proportions: Ten thousand to twelve thousand five hundred cubic centimeters of concentrated muriatic acid are mixed with three thousand to four thousand cubic centimeters of boric acid of such a degree of concentration that the mixture of the acids indicates 15° on the Baumé scale. These acids are mixed with fifteen thousand grams of burnt magnesia. A reaction takes place, as the burnt magnesia of commerce still contains carbonate of magnesia. By the reaction the mass is heated and carbonic acid and chloric gas are developed. The proportions of acid and magnesia may be varied according to the proportion of magnesium carbonate contained in the burnt magnesia. Care, however, should be taken that the proportionate quantities of burnt magnesia and acid are such that a basic magnesium chloride is produced, inasmuch as a surplus of muriatic acid would produce a neutral or acid magnesium chloride which has the property of absorbing moisture from the atmosphere and becoming deliquescent. By the addition of boric acid magnesium borate is formed, which, in connection with the basic magnesium chloride, forms a mixture which has a high degree of hardness and resistibility after setting and drying. After the reaction has taken place the mass is well stirred and mixed with a suitable pigment or pigments and a mineral or other filling substance for imparting the required color and body. The mass is then strained through a sieve and finally run into hard-rubber molds, in which it sets and hardens. Practical tests have shown that hard-rubber molds are best adapted for shaping the mass, as they are elastic enough to provide for the expansion and contraction of the mass while setting without being injured and rendered useless.

The fillings above referred to vary in material and proportion according to the character of the articles to be produced.

For floor-plates I use, for example, a filling composed of quartz sand or dolomite sand. To one part, by weight, of magnesium chloride I use from one to twelve parts of filling. For wall-tiles I use as a filling marble-dust or other powdered rock, as granite, baryte, feldspar, or limestone. In this case the proportions, by weight, are from one to three parts of filling to one part of magnesium chloride.

I may also use as a filling for wall-tiles, mantles, and other large plates organic substances—such as cotton waste, sawdust, and chaff—in the proportions of one to twelve parts of the filling to one part, by weight, of the magnesia which is used to form the magnesium chloride.

When a small proportion of filling is used, the product more closely resembles marble, and when the proportion of filling material is large the product will somewhat resemble sandstone or other stone.

When a filling material not acted upon by the muriatic or boric acid is used—such, for instance, as sand—the filling may be mixed directly with the muriatic acid, boric acid, and burnt magnesia before the reaction of these ingredients takes place.

The pigments employed to give color to the product are mineral pigments, and must be of such a character that they are not destroyed or discolored by the muriatic acid, boric acid, or magnesium chloride—such, for instance, as yellow ocher, terra di sienna, umber, red ocher, and chrome green. In the production of articles resembling white marble the pigment is omitted.

An analysis of the binding substance of this artificial stone, without the filling, may be expressed as follows:

$$5MgO + MgO + BO_3 + 2MgCl + 4HO$$

or

| | | |
|---|---|---|
| 5MgO | 100. | =33.25 |
| MgO+BO$_3$ | 69.94 | =23.24 |
| 2MgCl | 94.80 | =31.51 |
| 4HO | 36. | =11.97 |
| | 300.74 | =99.97 |

Therefore the substance is a combination of magnesium oxide, boric acid, and magnesium chloride with water. After mixture with silicates or sand some parts will go into a new combination corresponding to the natural combination in the serpentine and other minerals and similar to the equation $MO+3SiO_2+HO$.

Slabs, tiles, and other articles of great hardness may thus be produced in any suitable color and ornamentation, or with a smooth and bright surface, as required.

Having thus described my invention, I claim as new and desire to secure by Letters Patent—

1. The process herein described of making an artificial-stone composition, which consists in mixing burnt magnesia of commerce with concentrated muriatic and boric acids in the proportions substantially as set forth, so as to produce basic magnesium chloride and magnesium borate, mixing a filling therewith, and then subjecting the mixture to a molding operation.

2. A composition for artificial stone, consisting of basic magnesium chloride, magnesium borate, and a filling, substantially as set forth.

In testimony that I claim the foregoing as my invention I have signed my name in presence of two subscribing witnesses.

LUDWIG PREUSSNER.

Witnesses:
 OTIS EGAN,
 W. H. ADDICKS.